Figure 2:
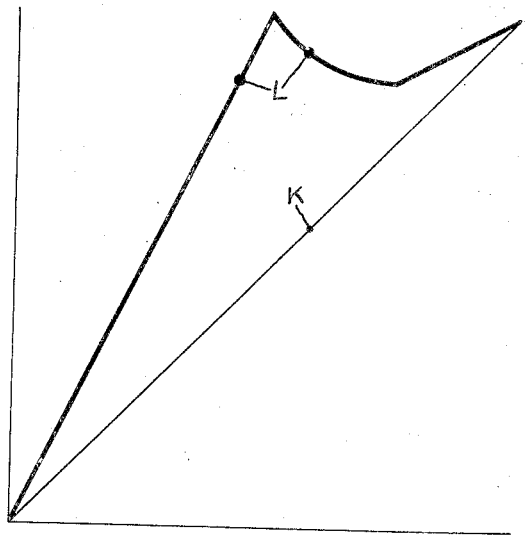

Nov. 8, 1938. J. AUGIER ET AL 2,136,227
ELECTRIC VALVE CONVERTING APPARATUS
Original Filed June 28, 1935   3 Sheets-Sheet 2

Inventors:
Jean Augier,
Pierre G. Laurent,
by Harry E. Dunham
Their Attorney.

Nov. 8, 1938.  J. AUGIER ET AL  2,136,227

ELECTRIC VALVE CONVERTING APPARATUS

Original Filed June 28, 1935   3 Sheets-Sheet 3

Inventors:
Jean Augier,
Pierre G. Laurent,
by Harry E. Dunham
Their Attorney.

Patented Nov. 8, 1938

2,136,227

UNITED STATES PATENT OFFICE 2,136,227

ELECTRIC VALVE CONVERTING APPARATUS

Jean Augier and Pierre Gabriel Laurent, Belfort, France, assignors to General Electric Company, a corporation of New York Application June 28, 1935, Serial No. 28,962. Renewed May 19, 1938. In France July 4, 1934

9 Claims. (Cl. 175—363)

Our invention relates to electric valve converting apparatus and more particularly to a method of operation of such converters over a wide range of output.

It is well known that the connection between an alternating-current network and a direct-current network, or between two alternating-current networks having different frequencies may be accomplished by means of static converters of uni-directional conductivity. It is also known that many of these apparatus lend themselves to regulation of the sequence of the moments at which the current is commutated from one electrode to the next, throughout the cycle of the alternating voltage wave applied to the system. This regulation may be accomplished by influencing auxiliary electrodes, such as grids, electrodes for starting the cathode spot, etc., or by influencing directly the circuits connected to the main electrodes, or by any other means of control.

It frequently happens in these apparatus, that the devices for controlling the commutation lend themselves readily to regulation of the moment at which the current is transferred from a given electrode to another electrode within the zone of the cycle where this transfer causes the current in each electrode to lag behind the voltage applied to the electrode (that is to say, within the zone where the transfer gives rise to a consumption of reactive power in the circuit connected to the electrode under consideration). On the other hand, the transfer of current from one electrode to the other within the zone where it would cause the current to lead the voltage, meets frequently with considerable difficulties.

It is furthermore common knowledge that it is possible to regulate the value of the voltage supplied by a mercury-vapor converter, which is constituted by several anodes that are arranged in front of a single-cathode or of several cathodes connected in parallel, and which is provided with devices which make it possible to prevent at will the ignition of one or the other of the anodes or cathodes by applying to said control devices alternating voltages that have the same frequency as the voltages applied to the anodes and comprising a system having the same number of phases as the system of the anode voltages, by causing a phase displacement between the system of voltages applied to the controlling devices with respect to the system of the anode voltages.

It is well known that this method of controlling permits retarding by an angle between 0° and 180°, approximately, the moment of current transfer between each one of the anodes and the following anode with respect to the moment at which the commutation would take place naturally in a rectifier without any controlling devices. It is also known that the ratio between the continuous potential and the alternating potentials varies nearly as the cosine of the angle by which the commutation has been retarded. Finally, it is common knowledge that the power factor of the apparatus varies nearly according to the same law, so that there corresponds to a given current flowing through the apparatus, a constant apparent power on the alternating-current side, regardless of the value of the continuous potential. The result is that whenever the voltage regulation must proceed within wide limits, the power factor is very poor for values far below the maximum voltage.

It is an object of the present invention to provide a method of regulating the commutation in converters and other electrical apparatus involving a discharge in ionized gases and vapors, which permits obtaining a regulation of the voltage of said converters within rather wide limits, while maintaining at the same time a good power factor.

It is a further object of the present invention to control the commutation between anodes in such sequence that all the anodes will function within a certain time interval thereby to prevent overheating of the anodes.

In accordance with our invention the moments of ignition of the various electrodes of the apparatus are retarded heterochronously, so that the electrodes having the same function are not all supplying energy for the same length of time during any cycle of the alternating voltage wave.

In order that the various electrodes of the converter may act thermally in the same manner, it will be advantageous to control the moments of commutation in such a manner that during a working period covering several cycles—a short time compared to the thermal constants of the electrodes—all the electrodes having the same function to perform will function for an equal duration of time within said time interval.

Figure 3:
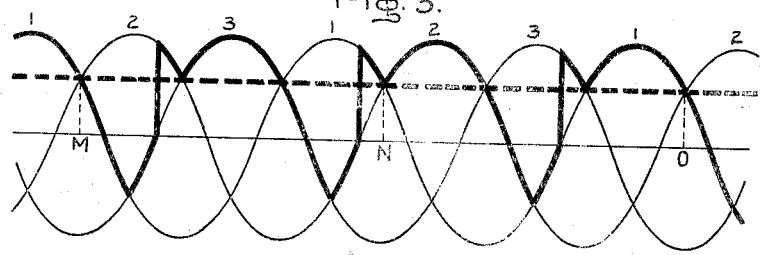

The novel features which we believe to be characteristic of our invention are set forth with particularity in the appended claims. Our invention itself, however, both as to its organization and method of operation, together with further objects and advantages thereof, may be understood best by reference to the following description taken in connection with the accompanyonly which is retarded by 90°. The dotted line parallel to the abscissa axis of Fig. 3 shows the mean value of the rectified voltage thus obtained. It will be noted that during the cycle MN, the anode 1 supplies energy during only three-twelfths of the cycle, the anode 2 during two-twelfths only, while the anode 3 supplies energy throughout seven-twelfths. During the cycle NO, anode 1 supplies energy during five-twelfths of the cycle, the anode 2 during six-twelfths, and anode 3 during one-twelfth of the cycle. Therefore, it will be noted that during the interval of these two cycles MO, all the anodes supply energy for the same duration of time, that is to say during eight-twelfths of the cycle, and that the quantity by which, within the cycle, the duration of the energy output of one of the anodes with respect to the mean energy output is decreased, is equal to the quantity by which this duration is increased during the following cycle.

If, instead of selecting 90° as a retardation value of the ignition, 120° were selected, there would be obtained by applying that retardation to one of two anodes, as in the present case, a rectified voltage which would be equal to one half the maximum voltage with a mean phase displacement of the current with respect to the voltages equal to zero. The mode of operation illustrated by Fig. 3 may be expressed generically by stating that in $n$-phase electric valve converting systems having $n$ number of controlled electric valves, a heterochronous retardation of the moment of ignition of certain valves in each polyphase cycle of $n$ phases is obtained by retarding in a group of $$\frac{n \pm m}{n}$$

cycles the moment of ignition of one or more valves which are less in number than $n$, the total number of valves, where $m$ is less than $n$, and in each successive group of $$\frac{n \pm m}{n}$$

cycles the same relative valve or valves with respect to the group of $$\frac{n \pm m}{n}$$

cycles is retarded so that over a period of $n \pm m$ cycles all the valves will have been conductive for an equal duration of time. While the illustration chosen shows a group of $n-m$ cycles, where $n$ is 3 and $m$ is 1 it of course will be apparent to those skilled in the art that the recurring groups of cycles could well be composed of $$\frac{n+m}{n}$$

cycles. If in such instance $n+m$ were equal to 4 it would be necessary to continue the operation for four cycles and at the end thereof it will be found that the period of conductivity of each of the different valves will total to the same amount. It furthermore will be apparent that this system of control may be equally as well applied to converting systems utilizing two groups of three or six phase units interconnected by an interphase transformer. In such case the mode of control will be applied to each fundamental group, that is, to each group of three or six phase windings, respectively, together with their associated electric valves or controlled electric discharge paths.

The control of the commutating devices for obtaining the regulation of the rectified voltage, in conformity with the method of the invention according to the examples of Figs. 1 and 3, may be accomplished by any appropriate means, for instance, the control electrodes or grids may be energized by a system of alternating potentials which may be sinusoidal or more or less rectangular and the frequencies of which could be one half the frequency of the anode voltages and in which the order of the phases is the reverse of the order of the system of anode voltages. It may be advisable to superpose, on these alternating potentials, a certain bias voltage which may be positive or negative and which may be constant or which may vary according to the value of the rectified voltage which is to be obtained.

It is also possible to utilize systems which apply to the grids positive voltage impulses of longer or shorter duration, at the precise instants when the commutation must take place. In the case of Fig. 1, for instance, these voltage impulses may be supplied by means of rotary commutators having contacts and brushes suitably arranged, or also by means of three induction regulators or phase shifters, one supplying the impulses giving rise to the ignition at moments such as P, which correspond to the ignitions accomplished 60° before the voltage maximum of the anode which becomes ignited; the second supplying impulses giving rise to ignitions at instants such as Q which correspond to the ignitions accomplished 120° before the maximum, and giving rise also to all the ignitions at the instants R which are necessary to obtain rectified voltages that are less than one half the possible maximum voltage; the third, finally, furnishing impulses which give rise to ignitions the phase of which varies between full voltage and one half voltage, that is to say ignitions at instants S. The induction regulators or phase shifters may be supplied at a frequency equal to one half the frequency of the alternating current that energizes the rectifier, or also at the latter frequency, but with the interposition of a rotary commutator which permits only one of two positive voltage impulses to reach the electrodes which it controls.

These systems for energizing the devices that control the moments of commutation and so make the principle of the invention operative are given only by way of example, and it is quite evident that other appropriate energizing systems can be used, without exceeding the scope of the invention.

In the example of Figs. 1 and 3, it has been stated that the ignition retardation was applied to the anodes, but one can, without leaving the scope of the invention, select another law.

The diagram of Fig. 4 refers to the case of the progressive regulation of the voltage of a three-phase rectifier from the maximum value to zero, by retarding the ignition at the rate of one of three anodes until a certain value of the voltage has been attained, and then at the rate of two anodes from among three.

The sinusoids 1, 2, 3 represent the alternating-voltage waves of the corresponding anodes. The curves $i_1$, $i_2$, $i_3$ below represent the variation of the anode currents. The heavy curve which is superimposed on the sinusoids represents the curve of the rectified voltage which is obtained by applying the regulating method according to the invention.

In the example to which Fig. 4 refers, initially the ignition of one anode, for example anode 1, is gradually retarded; then the ignition of the two other anodes is permitted to take place as soon as their potential becomes more positive than that of the cathode; after that, when the retardation which has been thus accomplished attains a value such that this anode 1 ceases completely to supply energy, the ignition of the following anode, for example anode 2, is gradually retarded. The explanations which have been given regarding the case of Fig. 1 will facilitate the understanding of the operation in the present case. It will be particularly noted that one obtains likewise a mean phase displacement which is equal to zero between the currents and the anode voltages in the zone TU which displacement corresponds to a mean rectified voltage equal to two thirds of the maximum voltage; the current in the anode 2 is in fact leading with respect to the voltage applied to said anode, while the current in anode 3 lags by the same amount behind the voltage of that anode.

In the modus operandi which has just been described, the anodes do not supply energy for the same duration of time, regardless of the number of cycles under consideration and even if the rectified voltage is maintained at any value corresponding to a retardation of the given ignition. If one wishes to reestablish a mean duration of the anode output which is equal for all the anodes, throughout the operating time of the rectifier, then the anodes the ignition of which is retarded must be permuted from time to time, first at the rate of one anode from among three, then of two anodes from among three, provided it is desired to reduce the rectified voltage to a value which is less than two thirds of the maximum voltage.

Fig. 5 shows an example of such a permutation of the anodes whose ignition is retarded. If the time during which the converter supplies energy is divided in intervals such as VW, WX comprising each three successive cycles, it will be seen that in the first interval, VW, which corresponds to relatively high values of the rectified voltage, it is necessary to begin by retarding the ignition of the anode 1 during the first cycle, after which it is necessary to retard the ignition of the anode 3 during the second cycle, then that of the anode 2 during the third cycle. During the interval WX, again in the same manner the ignition of the anode 1 is retarded, and the permutation continues under the same conditions as in the preceding interval. When all these ignitions have been retarded by 120°, which happens as soon as interval WX begins, the duration of the corresponding outputs drops to zero. If that retardation were to remain constant, it would be necessary to check as to whether the rectified voltage attained the two thirds of its maximum value; the mean phase displacement of the currents with respect to the voltages would then be zero.

To further decrease the rectified voltage (as shown in Fig. 5) without stopping at any particular value of the mean rectified voltage, the complete extinction of one anode from among three per cycle must be maintained and this can be accomplished by following the preceding permutation law; in addition it is necessary to retard gradually the ignition of each one of the anodes which follows immediately an extinguished anode. Thus, anode 3 being extinguished during the second cycle in interval WX, the ignition of anode 1 is retarded; in the following cycle, anode 2 must remain extinguished and the ignition of anode 3 is retarded, etc. . . .

Figure 7:
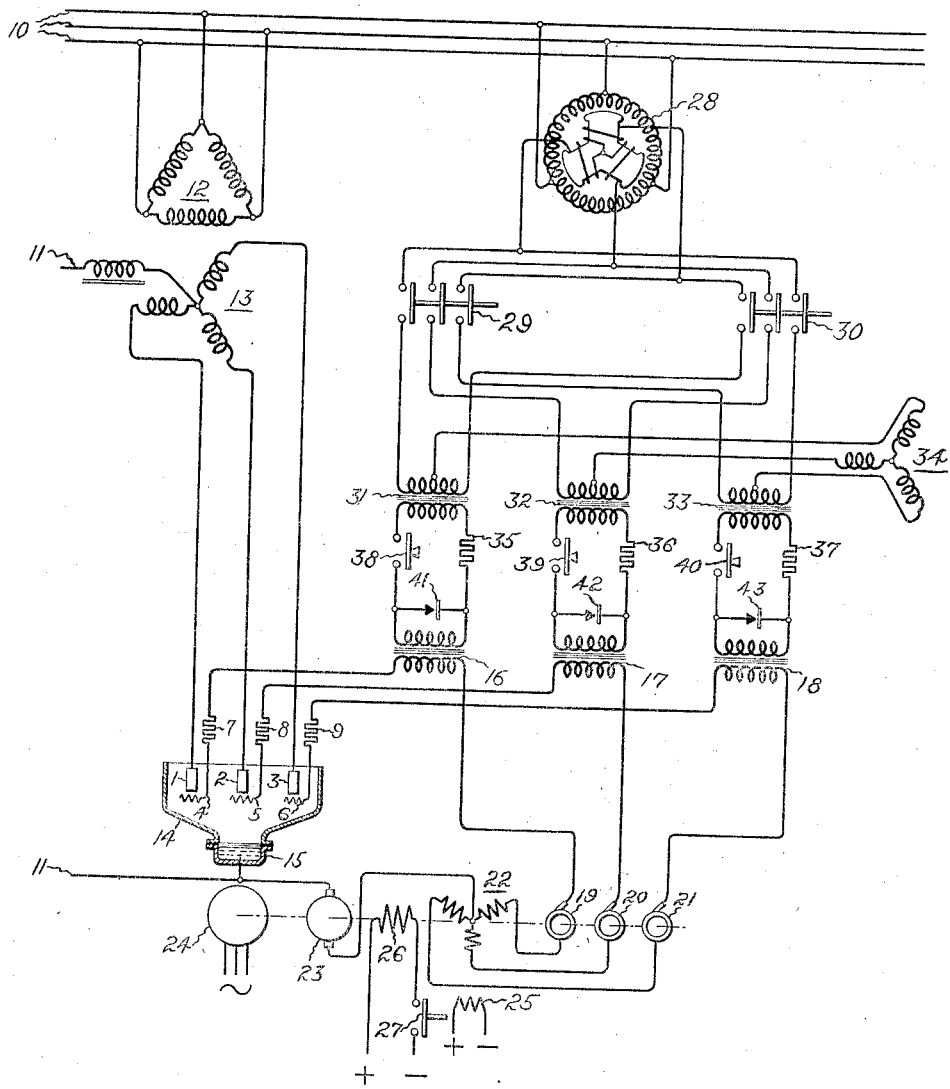

Assuming, as in the first example, that after having attained a certain value of the rectified voltage, that value were to be maintained by ceasing to modify the retardation of the ignition, then it would be necessary to check as to whether there would still exist a time interval that would be an exact multiple of a whole number of cycles—three cycles in this particular case—during which interval all anodes supplied energy for equal periods of time. It would be apparent also that there occurs at zero voltage, theoretically at least, a phase displacement between currents and voltages which is zero. This regime however, would be only possible (in conformity with the figure) if the direct-current system were highly inductive. Referring now to Fig. 7 of the drawings there is illustrated an arrangement for transmitting energy between an alternating current circuit 10 and a direct current circuit 11. The apparatus shown comprises a three phase electric valve converter, but as is apparent to those skilled in the art any other electric valve converting system could be utilized. This apparatus illustrated comprises a three phase primary winding 12 of a transformer having a star-connected secondary winding 13 which interconnects the direct current circuit 11 with the anodes of an electric valve 14. While the electric valve 14 is disclosed as being of the single cathode multi-anode type, it is understood that a plurality of electric valves may be substituted therefor. The respective anodes 1, 2 and 3 of the valve 14 which are connected to the secondary winding 13 are each provided with control grids 4, 5 and 6. The cathode 15 of this valve is connected to one side of the direct current circuit 11. The grid control circuits of the grids 4, 5 and 6 are preferably completed respectively through the grid current limiting resistors 7, 8 and 9, the secondary winding of the grid transformers 16, 17 and 18, the slip rings 19, 20, 21 of the three phase alternator 22 and the armature of the direct current generator 23 to the cathode 15. The alternating current generator 22 is arranged to supply alternating current of one-half of the frequency of the alternating current circuit 10. One manner of arranging this is by means of a synchronous motor 24 which may be energized from a suitable source of alternating current such as the line 10 and which is mechanically coupled to the direct current generator 23 and the alternating current generator 22 so as to maintain a proper synchronism between the output frequency of the generator 22 and the frequency of the alternating current line 10. The alternating current generator 22, which is provided with field 25 preferably energized from a source of direct current, is preferably of the type which will generate alternating current of a rectangular wave shape. The direct current generator 23 is excited by a field 26 which is energized from a suitable source of direct current through a switch 27.

It is apparent from the description thus far given that the grids 4, 5 and 6 may have impressed thereon a direct current biasing voltage supplied by the direct current generator 23 and an alternating current voltage of rectangular wave shape supplied by the alternating current generator 22. These control grids, however, also are energized by a component of alternating voltage derived from the source of alternating current 10. A phase shifter 28 energized from the source of alternating current 10 is connected through either of the switches 29 or 30 to the primary windings of the transformers 31, 32 and 33. The midpoints of the primary windings of the transformers 31, 32 and 33 are connected together by means of a three phase choke or inductor 34. The secondary windings of the transformers 31, 32, 33 are connected, respectively, through the current limiting resistors 35, 36 and 37 and the switches 38, 39 and 40 to the primary windings of the respective transformers 16, 17 and 18. The primary windings of the transformers 16, 17 and 18 may be provided with shunt circuits, in accordance with general engineering practice, comprising respectively the rectifiers 41, 42 and 43 which may be of the dry contact or copper oxide type.

It will be obvious to those skilled in the art that the arrangement disclosed in Fig. 7 may be operated either as a rectifier or an inverter but for the purpose of simplicity the operation for various output voltages will be described in terms of rectifier operation. For rectified voltage between full voltage and half voltage, the grids of the valve 14 are energized from circuits obtained by the following connections: Switches 29, 38, 39 and 40 are closed whereas switch 27 remains open. Thus the generator 23 does not supply any biasing voltage. For full voltage operation the phase shifter 28 is arranged so that all the anodes start at the beginning of their respective positive half cycles of anode voltage. It will be apparent to those skilled in the art that with the phase shifter 28 adjusted to give a retarded phase excitation of the main line frequency, the operation will be such that anode 1 fires normally, anode 2 is retarded, anode 3 fires normally, anode 1 is retarded, anode 2 fires normally, anode 3 is retarded and then this cycle of operation is repeated.

In order to operate in the range between half voltage and a lower voltage the switches of the previous arrangement must be operated in accordance with the following sequence. Switches 38, 39 and 40 are open in order to remove the excitation obtained from the alternating current circuit 10. This is done by opening these switches rather than the switch 29 as the opening of this switch may cause certain transient impulses to arise which would give false operation of the anodes of the rectifier. After switches 38, 39 and 40 are open switch 29 is opened and switch 30 is closed and then switches 38, 39 and 40 are closed. The switch 27 is also closed thus providing a negative bias for the grids. With the switches in this position it will be apparent to those skilled in the art that the operation of the anodes is as follows: Anode 1 starts normally, anode 2 cannot start, anode 3 starts normally, anode 1 cannot start, anode 2 starts normally, anode 3 cannot start. This cycle is then repeated.

When it is desired to change from a low voltage operation to half voltage or to a higher voltage the sequence of operation of the switches described above must occur in reverse order.

The invention can be likewise applied to the cases of two-phase, six-phase systems, etc. . . .

In the case of a six-phase system, instead of retarding equally the outputs of anodes 1, 2, 3, 4, 5, 6 according to the known methods, it is possible to retard only the outputs of anodes 1, 3, 5 or 1, 4 etc., and utilize combinations similar to those of Fig. 5 for instance, so as to utilize the durations of output periods of all the anodes throughout a certain time interval. Depending upon the relative proportions of the retarded and the non-retarded outputs, there will be found a zero phase displacement between alternating potentials and currents for more or less high values of the rectified voltage.

In the case of a two-phase apparatus, the performance will be rather advantageous if the output of one from among three anodes is retarded; upon this phase output becoming zero, one from among two of the remaining outputs is retarded.

At any rate, instead of simply retarding the ignitions of certain anodes, as in the examples which have been already given, one can evidently retard all the ignitions without exception, provided this is done heterochronously.

In the preceding examples a rectifier has been assumed, but the invention can be also applied to inverters, which transfer the energy of a direct-current system to an alternating-current system, or to modulating converters or frequency changers which permit the transmitting of energy at an adjustable voltage between two alternating-current networks of different frequencies, and in general, to all electrical apparatus involving a discharge in ionized gases or vapors.

In particular, in the case of an inverter it suffices to substitute for the retarded ignition of the anodes, a leading of the ignition with respect to the moments of commutation corresponding to the negative maximum rectified voltage—which moments correspond themselves to a maximum lag in the ignition approximating 180°—in order to obtain waves the voltage of which is symmetrical to those that correspond to the rectifier operation, all precautions being taken to avoid any missing in the ignition.

Figure 6:
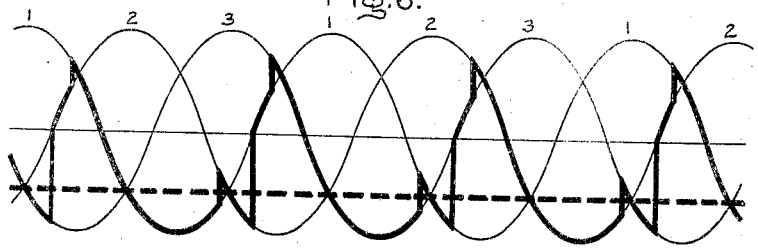

Fig. 6 shows the operating diagram of an inverter which is adjusted in conformity with the invention. This diagram is obtained by following the preceding law, i. e. by starting from the rectifier operation represented in Fig. 3.

While we have shown the application of our invention to certain specific embodiments it will, of course, be understood that we do not wish to be limited thereto since it is apparent that the principles herein disclosed are susceptible of numerous other applications without departing from the spirit and scope of our invention as set forth in the appended claims.

What we consider new and desire to secure by Letters Patent of the United States, is:

1. In a polyphase electric valve converter having a plurality of controlled electric valves, the method of operation which comprises introducing into each successive polyphase cycle a heterochronous progressive retardation of the time of ignition of certain of said valves thereby to reduce gradually the power output of said converter.

2. In a polyphase electric converter having a plurality of controlled valves the method of operation which comprises progressively retarding the time of ignition of one of said valves during successive cycles of operation until one of the valves is non-conductive during each cycle and then progressively retarding the time of ignition of another valve until a second valve also is non-conductive during each cycle thereby progressively reducing the power output of said converter with an improvement in the power factor-output characteristic.

3. In a polyphase electric valve converter having a plurality of controlled electric valves, the method of controlling the output which comprises heterochronously and progressively retarding the time of ignition of only certain of said valves during each cycle to reduce progressively the power output thereof.

4. In a polyphase electric valve converter having a plurality of controlled electric valves, the method of controlling the power output which comprises alternately retarding the instant of ignition of only certain of said valves in a cycle and only the remaining valves in the next succeeding cycle.

5. In a polyphase electric valve converter having a plurality of controlled electric valves, the method of operation which comprises retarding the time of ignition of a different one of said valves each cycle, and increasing progressively the retardation to reduce progressively the power output of said converter.

6. In an $n$-phase electric valve converting system having $n$ controlled electric valves, the method of operation which comprises producing a heterochronous retardation of the moment of ignition of certain valves in each polyphase cycle of $n$ phases by retarding the moment of ignition of one or more valves which are less than the total number in a group of $$\frac{n \pm m}{n}$$

cycles, where $m$ is less than $n$, and in each successive group of $$\frac{n \pm m}{n}$$

cycles retarding the moment of ignition of the same valve or valves relative to said group of $$\frac{n \pm m}{n}$$

cycles.

7. In an $n$-phase electric valve converting system having $n$ controlled electric valves, the method of operation which comprises reducing the energy output of one or more valves which are less than the total number in a group of $$\frac{n \pm m}{n}$$

cycles of alternating current, where $m$ is less than $n$, and in each successive group of $$\frac{n \pm m}{n}$$

cycles reducing the energy output of the same valve or valves relative to said group of $$\frac{n \pm m}{n}$$

cycles whereby in a period of $n \pm m$ cycles all valves have been conductive for the same duration of time.

8. In an $n$-phase electric valve converter having a plurality of controlled electric valves, the method of operation which comprises reducing the energy output of one or more valves which are less than the total number in a group of $$\frac{n \pm 1}{n}$$

cycles of alternating current and continuing to reduce the energy output of the same relative valve or valves within succeeding groups of $$\frac{n \pm 1}{n}$$

cycles so that in a period of $n \pm 1$ cycles each valve will have been conductive for the same duration of time.

9. In an $n$-phase electric valve converting system having $n$ controlled electric valves, the method of operation which comprises producing a heterochronous progressive retardation of the moment of ignition of certain valves in each polyphase cycle of $n$ phases by retarding the moment of ignition of one or more valves which are less than the total number in a group of $$\frac{n \pm m}{n}$$

cycles, where $m$ is less than $n$, and in each successive group of $$\frac{n \pm m}{n}$$

cycles increasing the retardation of the moment of ignition of the same valve or valves relative to said group of $$\frac{n \pm m}{n}$$

cycles.

JEAN AUGIER.
PIERRE GABRIEL LAURENT.

Nov. 8, 1938.　　　　F. W. ENGSTER　　　　2,136,238
OVERHEAD CABLE INSTALLATION
Filed June 12, 1936
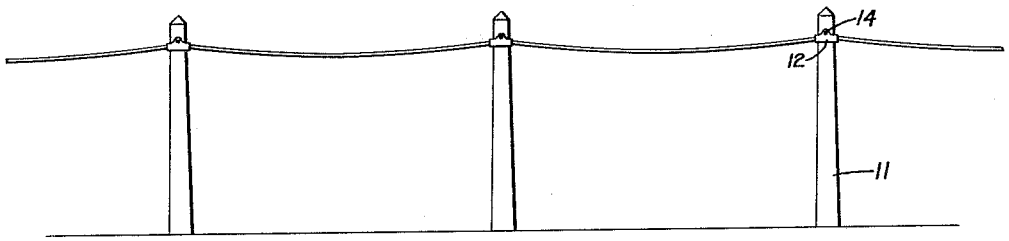
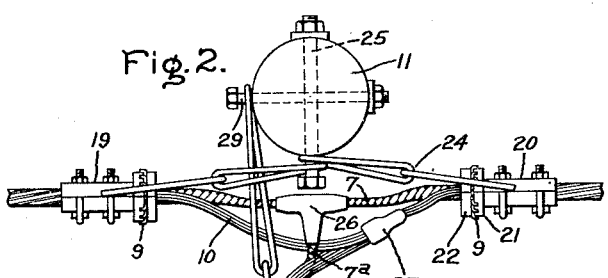
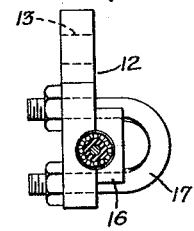
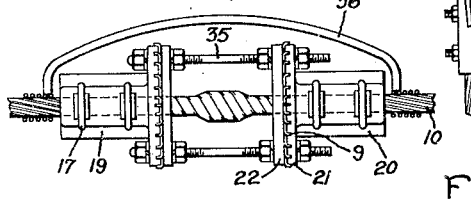
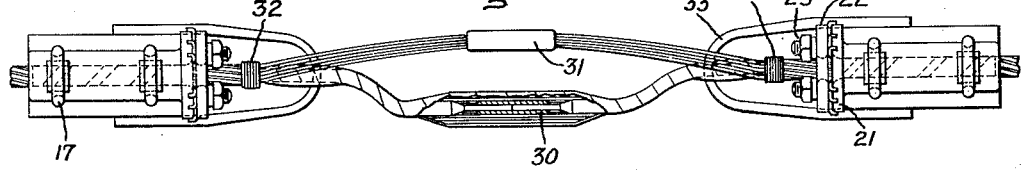
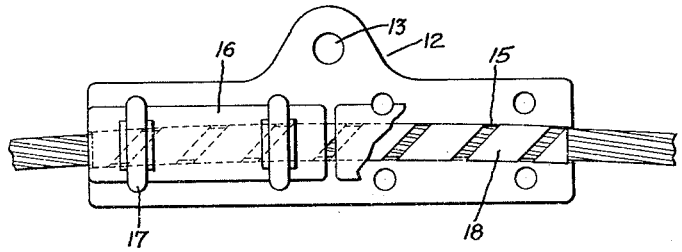
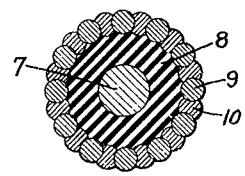
Inventor:
Frank W. Engster,
by Harry E. Dunham
His Attorney.